United States Patent
Goodman et al.

(10) Patent No.: US 6,765,743 B2
(45) Date of Patent: Jul. 20, 2004

(54) MICRO-ACTUATOR TRANSDUCER STACK INERTIA CANCELLATION CONTROL

(75) Inventors: Dale E. Goodman, Oronoco, MN (US); Eric A. Eckberg, Rochester, MN (US)

(73) Assignee: Hitachi Global Storage Technologies Netherlands. B.V., Amsterdam (NL)

( * ) Notice: Subject to any disclaimer, the term of this patent is extended or adjusted under 35 U.S.C. 154(b) by 431 days.

(21) Appl. No.: 09/837,691

(22) Filed: Apr. 18, 2001

(65) Prior Publication Data

US 2002/0154436 A1 Oct. 24, 2002

(51) Int. Cl.[7] .............................................. G11B 21/02
(52) U.S. Cl. .................... 360/75; 360/78.05; 360/78.12
(58) Field of Search ................................ 360/75, 78.12, 360/78.05

(56) References Cited

U.S. PATENT DOCUMENTS

| | | | |
|---|---|---|---|
| 4,616,277 A | 10/1986 | Berti ............................ | 360/78 |
| 4,858,040 A | 8/1989 | Hazebrouck ............. | 360/78.05 |
| 4,967,293 A | 10/1990 | Aruga et al. ............. | 360/78.12 |
| 5,062,012 A | 10/1991 | Maeda et al. .................. | 360/75 |
| 6,034,834 A * | 3/2000 | Yoshikawa et al. ........... | 360/75 |
| 6,052,251 A | 4/2000 | Mohajerani et al. ..... | 360/78.05 |
| 6,483,659 B1 * | 11/2002 | Kobayashi et al. ...... | 360/78.04 |
| 6,496,323 B1 * | 12/2002 | Umeda et al. ............ | 360/78.09 |
| 6,522,494 B1 * | 2/2003 | Magee ........................ | 360/75 |
| 6,614,613 B1 * | 9/2003 | Huang et al. ................. | 360/75 |

FOREIGN PATENT DOCUMENTS

JP          04-161077          6/1992

* cited by examiner

*Primary Examiner*—David Hudspeth
*Assistant Examiner*—K. Wong
(74) *Attorney, Agent, or Firm*—Leslie J. Payne; Patrick W. Duncan

(57) ABSTRACT

A micro-actuator of a head suspension either is wired in a reverse polarity to effect movement of the suspension arms in opposing directions relative to the magnetic disks or reversed in physical orientation and wired identically. This permits a single micro-actuator control signal to control all micro-actuators and thereby cancel the affects of inertia of the suspension arms and the read/write heads on the actuator arms as half of the suspension arms and magnetic heads move in one direction while, simultaneously, the other half of the suspension arms and magnetic heads move in a second, opposite direction in response to a single control signal, simplifying wiring and control electronics. The counter-movement of the suspension arms and magnetic counter the inertia and inertial forces and expedite the settling into their stable recording/reading positions, thereby reducing seek times and improving disk drive performance.

14 Claims, 6 Drawing Sheets

MICRO-ACTUATOR TRANSDUCER STACK INERTIA CANCELLATION CONTROL

FIELD OF THE INVENTION

This invention relates to the control of the actuator arm and suspension arm of a magnetic data storage disk drive and, more specifically, to the control of the actuator suspension arms in a manner to cancel or eliminate inertia effects of the magnetic read/write transducer and actuator assembly on the actuator arm and actuator mechanism.

BACKGROUND OF THE INVENTION

Magnetic data storage disk drives typically have multiple magnetic recording disks, which are non-magnetic disk-shaped substrates with a stable magnetically coercively-alterable coating layered on the surface of the substrate. A plurality of such magnetic recording disks are assembled in stacks. The disk surface coating receives and records individual data bits in a magnetic domain for each bit signal sent to the magnetic read/write head flying above the revolving disk.

Over the past several years with the materials used, the techniques for coating the surfaces of the disks and control of the magnetization of the surface domains have improved to the point that, in orders of magnitude, data domains on an area of a modern magnetic data storage disk may be smaller and more densely positioned, permitting vast increases in the storage capacity of such disk drives or, alternatively, permitting a very significant reduction in size of the disk pack or disk stack and the disk drive. With the improved storage capability now available, significant performance improvement of the disk drives and storage capacity has evolved.

One of the benefits of the improved storage capacity is the reduction in size of the disk drives. Smaller disk drives allow faster rotation of the disks with limited power. Faster rotation permits quicker "seek" times in accessing a particular selected data location on the magnetic disk.

In order to fully utilize the storage capability of the magnetic disks, the placement of the magnetic read/write head must be refined to further record data and read data in still denser patterns.

One problem associated with the higher data density on the magnetic data storage disks is the requirement for higher resolution in placement of the magnetic read/write head over a selected data track of the disk. Placement of the magnetic read/write head typically is accomplished by an actuator and actuator arm. A typical actuator is a voice coil motor having the capability of moving one component of the voice coil motor relative to another fixed member in a precise manner. The actuator displaces the actuator arm relative to the actuator frame around a pivot axis. An actuator is typically formed to have an arm extending in proximity to a recordable surface of the magnetic storage disk. Where both surfaces of such a disk are recordable, there is an actuator arm for each side of the magnetic storage data disk. The actuator arm supports a further extension on the distal end of the actuator arm. The extension serves as a suspension or suspension arm for a magnetic read/write head and provides stable support for the magnetic read/write head.

In recording disk drives due to the limited resolution of the actuator drive, the actuator is capable of only limited positioning of the suspension and the read/write head.

To significantly increase the resolution of the actuator and the number of recording tracks on a data storage disk and therefore increase the data capacity of the disk, the suspensions have been provided with electronically actuated micro-actuators. Micro-actuators are designed in a number of different ways, such as by using magneto-strictive devices, piezo-electric members, bimorphic materials or other materials or structures that change at least one dimension of the element in response to connecting therewith or impressing thereon an electronic signal of a selected polarity. The micro-actuator will respond in an opposite manner to an electronic signal of an opposite polarity.

Many examples of micro-actuator construction are known and any of them may be inserted into one leg of a suspension arm or implemented into the suspension such that its dimensional change effects a movement of the magnetic read/write head to one side or the other of the "null" or no electronic signal position. Typically, the read/write head may be displaced to positions on either side of the null position.

Examples of micro-actuators incorporated into an actuator arm assembly are U.S. Pat. No. 4,858,040 as issued to Henry Hazebrouck, which uses bimorphic materials, and U.S. Pat. No. 6,052,251 as issued to Khogrow Mohagerani, which uses a piezo element.

The direction of movement of both the suspension arm and the magnetic read/write head is controlled by the polarity of the electronic signal transmitted to the micro-actuator. For example, a piezo-electric element will bend whenever an electrical voltage is applied thereto, and a reversal of the polarity of the voltage will cause the curvature to be in the opposite direction. Similarly, whenever a magneto-strictive device is employed, the length of the device changes in proportion to the voltage applied thereto. Reversal of the polarity of the electrical signal will cause the device to change dimension in the opposite direction, either contracting or extending depending upon the polarity of the magneto-strictive device.

By placing such an element of selected size in one of two legs of an actuator suspension and sending either positive or negative electronic signals to the element, the expansion or contraction of this element distorts the relatively weak suspension and displaces the magnetic read/write head laterally with respect to the actuator arm, as described above.

One by-product of the size reduction afforded by the higher density of recording on the disk or disks of the disk drive is that as actuator assembly members are reduced in size the cross-sectional area of various portions of components, such as the actuator arm and suspension, are reduced exponentially. Accordingly, the inherent stiffness of the component is reduced or compromised as the cross-sections are reduced.

With reduced or compromised stiffness, the inertia of the components of the actuator assembly becomes a more critical factor and degrades the seek time of the disk drive, thereby adversely affecting the efficiency of the disk drive in both recording and retrieving of the data.

Inertia within the actuator assembly will cause undesired displacement of the actuator arms about the actuator pivot axis, further compromising the accuracy of the placement of the magnetic read/write head until the inertia forces are dissipated and the actuator arm returns to the selected position as controlled by the voice coil motor. This dissipation of forces and the return of the actuator arm to its selected position is referred to as "settle out," and the delay in being able to electronically access the magnetic read/write head caused by the settle out time degrades the seek time of the disk drive. "Seek" time is the sum of the periods of time from the receipt of the commands to reposition the magnetic read/write head over a selected track until the actuator has attained the new position, plus the time (if a serial function) to displace the magnetic read/write head relative to the actuator arm and settle out time and, lastly, the time until the designated location on the recording track passes under the magnetic read/write head. The component of seek time that may be affected most efficiently is the settle out time of the actuator arm. If settle out time of the actuator arm may be influenced or significantly reduced, this permits more seek operations within a set time period and, consequently, improves the through-put of the disk drive in either writing or reading the disks.

Whenever a coarse or null position of the actuator is selected, the voice coil motor of the actuator drive quickly repositions the actuator arms to predefined positions corresponding to the null position for the group of tracks within which the desired data or recording location is found. The voice coil motor acts to resist the inertia of the actuator arms. However, the inertia of the further repositioning of the magnetic read/write head on the distal ends of the suspension arms in selecting the precise recording track position causes an undesired force acting on the actuator arms causing a momentary deviation from the null position selected, which could require additional settle time before the data under the magnetic read/write head may be written to the disk surface or the data read from the disk surface.

With the reduction in size of the disk drives, the selecting and driving of micro-actuators on the actuator arms suspension to select the track requires an extensive wiring harness or a great number of conductors in a flexible cable. This additional mass extending to the distal end of each suspension also increases the inertia of the suspension supporting each magnetic read/write head as the conductor must extend past the end of the actuator arm to the suspension.

If the data is written to the disk during the period that the head is inertially displaced laterally from the design recording path, the recorded data will not be readable by a magnetic read/write head positioned properly over the design path position for the particular data track. Similarly, for properly positioned recorded data, the data will not be reliably readable due to the inertial deviation of the magnetic read/write head from the design recording track position due to the mass of the total suspensions shifting the actuator arms. Accordingly, the settle time must be allowed to permit the suspensions to stop oscillating and stabilize their positions as well as permitting additional settle time for the actuator.

With 50,000 data tracks per inch (tpi) or 1970 tracks per millimeter (tpmm) the distance from the centerline of each of the concentric recording tracks to the centerline of an adjacent recording track is about 0.00002 inches (0.50 microns). A very small amount of oscillation of a magnetic read/write head supported on the end of the suspension and the actuator arm can easily, albeit momentarily, deflect the position of the actuator arm comb and require a longer seek time to insure the reliable reading or writing of data to the magnetic disk. The extended seek times over a period of time can cumulatively reduce the data throughput of the magnetic read/write head and thus reduce the efficiency of the disk drive.

If the affects of the inertia forces encountered by the actuator arms can be controlled or counteracted, the actuator arms will not be as affected by the movement of the suspensions and magnetic heads and the resulting inertia. The magnetic read/write heads will seek and settle in their design positions much more rapidly, therefore permitting shortened access times for positioning the magnetic read/write head over the desired data track for either reading data from or writing data to the selected data track of the magnetic storage disk.

OBJECTS OF THE INVENTION

It is an object of the invention to counteract the detrimental effects of inertia caused by the displacement of the magnetic read/write heads and suspension arms of the magnetic disk drive.

It another object of the invention to cancel the inertia of a first magnetic read/write head and suspension moving in a first direction with the inertia of a second magnetic read/write head and suspension moving in a second direction.

It is an additional object of the invention to simultaneously displace a first portion of the magnetic read/write heads and the head suspensions of a disk drive in a first direction and a second portion of the magnetic read/write heads and the head suspensions in a second opposite direction.

It is still another object of the invention to physically select a first group of magnetic read/write heads and physically select a second group of magnetic read/write heads and to control lateral displacement of said first and second groups electronically, thus moving the two groups of magnetic heads in opposite directions to reduce inertia effects in an actuator assembly.

It is still an additional object of the invention to physically select a first group of magnetic read/write heads and physically select a second group of magnetic read/write heads and to control lateral displacement of said first and second groups electronically with a single electronic signal provided to each micro-actuator positioning each magnetic read/write head of both groups.

It is a still further object of the invention to fabricate a first group and a second group of micro-actuators with an electronically controlled element connected in opposite polarity so as to respectively expand or contract in response to a first polarity signal and contract or expand in response to a second polarity signal.

These and other objects of the invention are accomplished and the deficiencies of the prior art are overcome by the invention summarized below in the Summary of the Invention.

SUMMARY OF THE INVENTION

This Summary of the Invention is provided as a brief understanding of the invention and is not intended to be limiting of the invention in any manner.

In summary, a conventional actuator assembly may be modified to form the invention. The modification is accomplished in the wiring of the micro-actuator on each actuator arm. The micro-actuator, without regard to the type of element used, has a polarity associated with its physical formation. A micro-actuator may be one of a variety of devices from which movement or displacement of attached members may be derived whenever energized with an electrical signal. For example, magneto-strictive, piezoelectric, bimorphic materials or any other type device or material that changes dimensions or shape in response to impressing an electrical voltage across the electro-active element of the micro-actuator may be used to form the micro-actuator.

In this invention, the micro-actuators are divided into two groups. For ease of description and discussion, the groups may be designated as an "A" group and a "B" group.

The A group and the B group should be made up of equal or substantially equal numbers of micro-actuators. As an example, the A group micro-actuators will be attached to the micro-actuator mountings on a read/write head suspension to flex, extend or contract to displace the magnetic head away from a null position responsive to an electronic signal of a first polarity. The group B micro-actuators will be identical in physical type and structure to the A group micro-actuators. Further, the suspensions of the B group are installed in an identical physical orientation relative to each disk recording surface, (i.e., as viewed from a position where the suspension and micro-actuator are viewed with the magnetic disk surface behind the suspension, and the micro-actuator is located in one leg of the suspension or alternatively installed in an opposite physical orientation relative to the disk recording surface and wired in a reversed manner or polarity from the A group micro-actuators). Thus, the micro-actuators of the B group will cause the movement of the magnetic read/write heads in the opposite direction to the movement of the micro-actuators of the A group relative to the axis of rotation of the disk.

Whenever the micro-actuators of the B group are installed in a reversed physical orientation from the micro-actuators of the A group, wiring connections must be reversed to accomplish the opposite direction movement of the suspensions and magnetic heads of one group relative to the other group.

The designation of the group A micro-actuators and the group B micro-actuators may be made in a number of ways. The typical multiple disk drive has a stack of disks and an actuator member which comprises a journal defining the pivot axis and a plurality of arms extending from the actuator member journal. Each arm extends between two adjacent disks or above or below the top or bottom disk respectively. Each actuator arm inserted between the adjacent disks supports two suspensions having two micro-actuators and two magnetic read/write heads, one on each suspension. The head positioning assembly, including voice coil motor armature, journal and actuator is commonly referred to as an actuator.

Thus, if all the suspensions and micro-actuators are identically manufactured and assembled and are only reversed whenever the suspensions are attached to the actuator arm so that the magnetic read/write head faces an associated magnetic disk recording surface and if the same signal is applied to all of the micro-actuators, the Group A micro-actuators may be the odd numbered micro-actuators and the group B micro-actuators may be the even numbered micro-actuators where the micro-actuators are numbered sequentially from one end of the actuator arm and suspension stack to the other end thereof.

With regard to the immediately above described arrangement, for example, the A group micro-actuators will move the magnetic read/write head outward from and away from the disk stack rotational axis and the B group micro-actuators will move the magnetic read/write head inward and toward the disk stack rotational axis in response to each of the micro-actuators receiving an identical command signal of a first polarity. If the signal polarity is reversed, the micro-actuators of the A and B groups will move in directions opposite to those described above.

Whenever the term "recording position" is used, the term is intended to include the position occupied by the magnetic read/write head during either a read cycle or operation or a write cycle or operation.

By way of further example, if the upper most one-half of the micro-actuators are desired to be moved in one direction (e.g., inwardly toward the disk axis) and the lower one-half of the micro-actuators are desired to be moved in the opposite direction (e.g. outwardly from the disk axis) in response to a single signal of predetermined polarity, some of the micro-actuators of the system either would have to have the polarity of the micro-actuator reversed or the wiring connections reversed in polarity. As in this example, the odd numbered micro-actuators in the upper half of the micro-actuators would require a reversed polarity wiring or the micro-actuator installed in a reversed position relative to the suspension and the even numbered micro-actuators in the lower half treated in the same manner.

On the other hand, the polarity of the wiring connections for both micro-actuators supported on the actuator arms disposed between adjacent disks and the topmost and bottommost micro-actuators must be opposite to each other in order to get the heads disposed on a single actuator arm to move in the same direction. In this design scenario, the polarity of the connections on a selected actuator arm would be reversed relative to the respective connections of the next adjacent arm.

Various other arrangements may be brought to mind of the person of ordinary skill in the art after understanding this invention.

Half or substantially half of the micro-actuators must be displaced in a direction opposite to the other half. The essential aspect of the invention is to cause inertia of one half of the head movement to counteract or cancel the inertia from the other half of the head movements.

In order to reduce the wiring needed to select the appropriate track, the micro-actuators control wiring is simplified by connecting all micro-actuators through a single trunk conductor and a plurality of branch conductors to a single signal causing all micro-actuators to be energized by the same signal.

By using a single signal to command the micro-actuators movement, the wiring of the micro-actuators is greatly diminished and simplified, resulting in other benefits.

This Summary of the Invention is intended as a brief summary description of some of the various embodiments including the preferred embodiment of the invention and is not intended to limit the invention in any manner.

A more complete and detailed understanding of the invention may be had from the attached drawings and the Detailed Description of the Invention which follows.

DETAILED DESCRIPTION OF THE BEST MODE

OF THE PREFERRED EMBODIMENT OF THE INVENTION AS CONTEMPLATED BY THE INVENTORS

Figure 1:
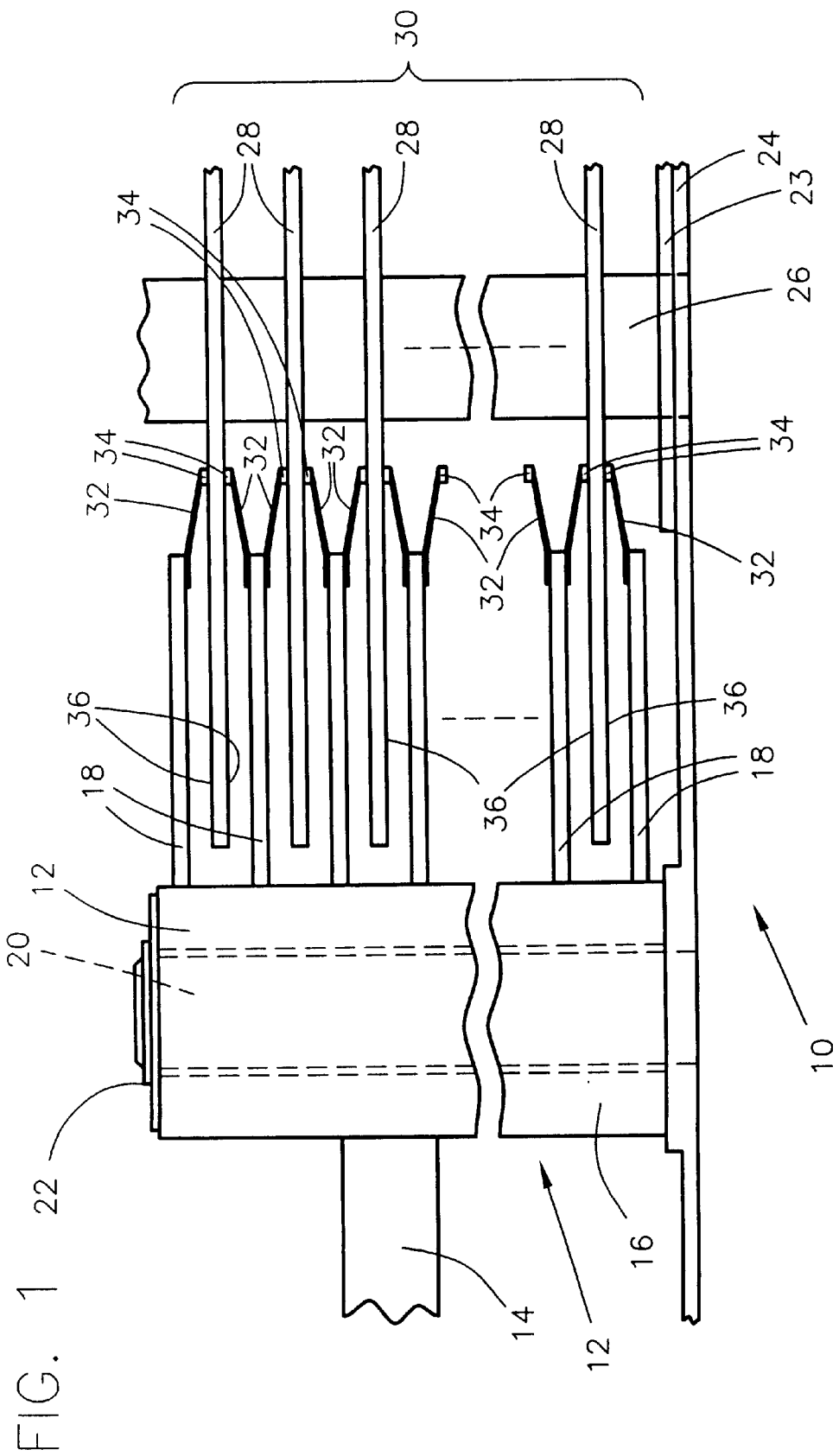
FIG. 1 is a partial side view of a multi-disk drive with a portion of the disk stack and a portion of the actuator arm assembly illustrated.

Refer initially to FIG. 1. FIG. 1 is a side view of a portion of an interior structure of a magnetic disk drive 10. Only portions of the magnetic disk drive 10 that are relevant to the invention are illustrated.

For purposes of description, some reference to prior art mechanisms and devices is necessary as this invention is an improvement to a prior art type magnetic storage disk drive.

FIG. 1 illustrates an actuator arm assembly 12 which is made up of input arms 14, a journal 16 and a plurality of actuator arms 18 projecting from the journal 16. Journal 16 is disposed surrounding and pivoted on a shaft 20 and retained by a retainer 22 engaged with shaft 20 and preventing the axial movement of actuator arm assembly 12 relative to shaft 20.

A drive motor 23 of conventional construction and mounted on a base plate 24 of the disk drive 10 is coupled to a rotor 26 supporting the magnetic data storage disks 28. The motor 23 rotates the disks 28 that form a disk stack 30. All disks 28 rotate in synchronism.

The actuator arms 18 are disposed interleaved with the magnetic disks 28 of disk stack 30. On the distal end of each actuator arm 18 is mounted a magnetic read/write head suspension 32 for each magnetic data recording surface 34 of disk 28 served and accessed by the actuator arm 18. On the two most outboard access arms 18 are mounted magnetic read/write head suspensions 32 and the remainder of the actuator arms 18, each supporting two suspensions 32. The magnetic read/write head suspensions 32 are oriented to face the recording and reading surface 36 of the magnetic read/write head 50 toward and position the magnetic read/write head 50 juxtaposed to the recording surface 36 of the magnetic disk 28. The magnetic read/write head 50 is separated from the magnetic disk surface 34 by a thin film of air, thereby causing the magnetic read/write head 50 to fly above the disk surface 34.

Controlled by a voice coil motor (not shown), the actuator arm assembly 12 pivots about shaft 20 in a conventional and well-known manner. As the actuator arm assembly 12 is displaced about shaft 20, the actuator arm 18 sweeps across the magnetic disk recording surface 34 to access the recording tracks on the rotating disk magnetic disk 28.

With the recording density of about 50,000 tracks per inch (tpi) or 1970 tracks per mm (tpm), a spacing between track centerlines of about 0.00002 inches or 0.50 micron results.

Figure 2:
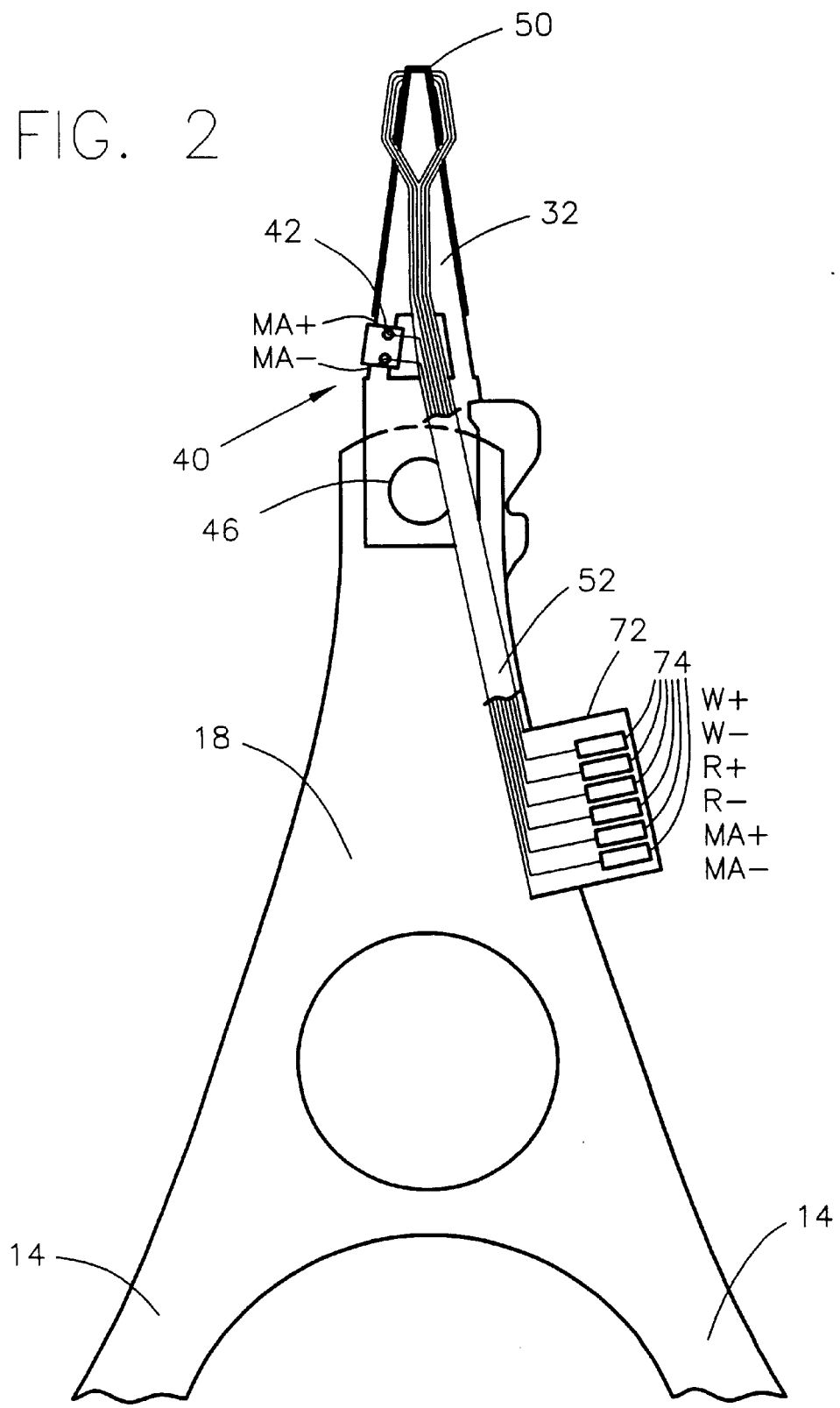
FIG. 2 is a top view of a portion of an actuator arm and magnetic read/write head suspension together with the flexible circuit associated with the micro-actuator and the read/write head.
Figure 3:
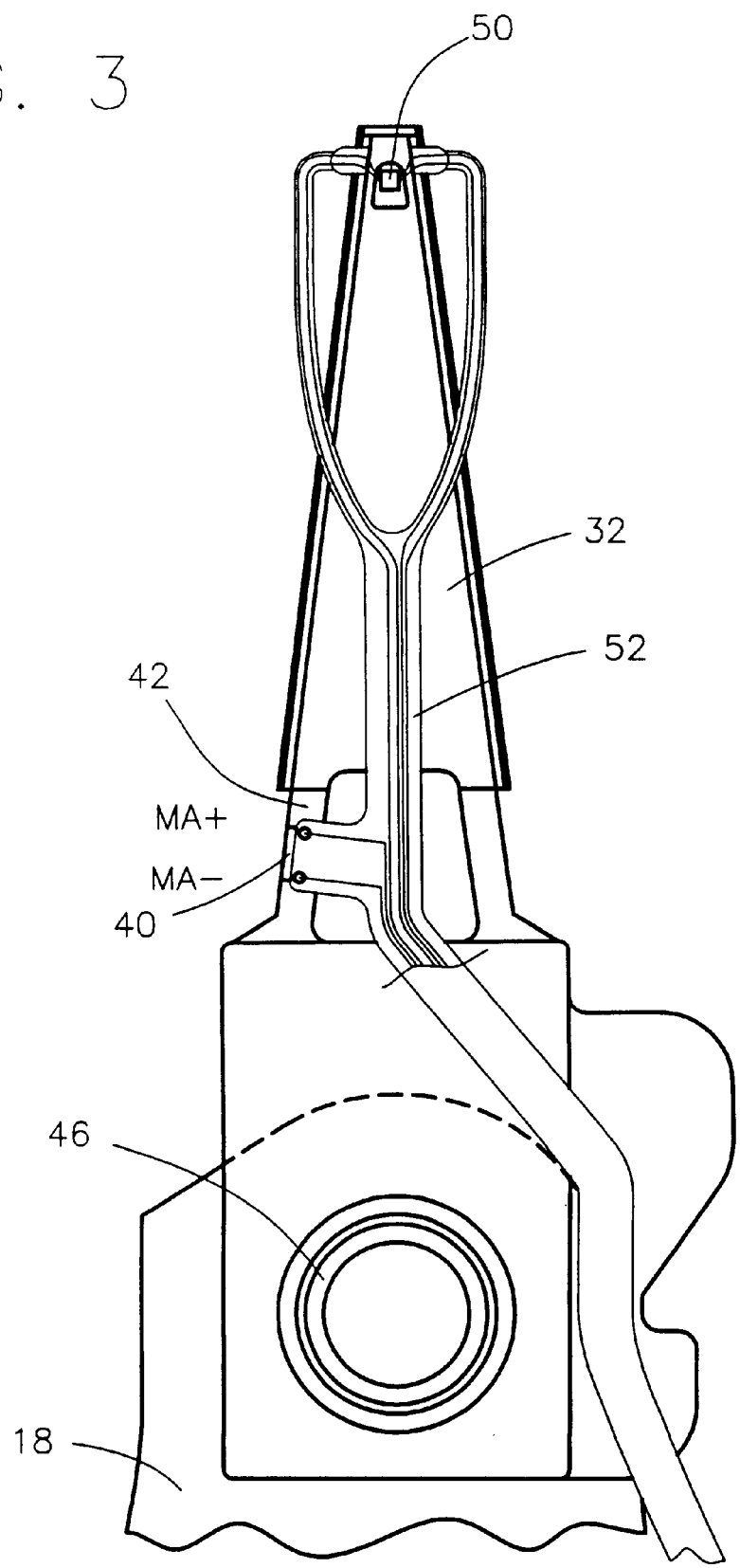
FIG. 3 is an enlarged top view of the micro-actuator and read/write head suspension arm together with a more detailed presentation of the flexible circuit connected to the micro-actuator and read/write head.

Refer now to FIGS. 2 and 3. By inclusion of a micro-actuator 40 in the structure of the magnetic read/write head suspension 32, the magnetic data read/write head 50 may be laterally displaced for fine positioning on either side of the nominal or null position of the magnetic read/write head 50 with respect to the null, non-distorted, or "at rest" position of the suspension 32 whenever the micro-actuator 40 is not receiving an electronic signal.

In order to displace the magnetic read/write head 50 left or right of the null position, a micro-actuator 40, such as illustrated in FIGS. 2 and 3, can be fabricated into one leg 42 of suspension 32. Only one leg 42 is shown for simplicity, but it should be understood that other configurations are also possible. The micro-actuator 40 may be any material which changes shape or dimensions under the influence of an electrical current [potential] applied across the device. The very small movement of the suspension 32 moves the distal end thereof either left or right of the null or no signal (no deformation) position and permits placing the magnetic read/write head 50 with better resolution.

The actuator arm 18 supports the suspension 32 by being rigidly attached by conventional means such as swaging at attachment zone 46.

The magnetic read/write head 50, supported on the distal end of suspension 32, requires four electronic signals to function, read+, read−, write+ and write−, as do the conventional magnetic read/write heads of prior art magnetic disk drives. The above enumerated signals are respectively indicated in the drawings as R+, R−, W+ and W−. In addition, the invention requires two additional signals to fully control the micro-actuator 40. The signals are designated MA− and MA+. Because the micro-actuator 40 is responsive to the MA+ and MA− signals in proportion to the signal strength, each polarity signal may cause the attainment of a plurality of displaced positions of the magnetic read/write head 50 and the suspension 32.

If, as is presently known, only the selected micro-actuator 40 is activated to place the head over the selected recording track, a very extensive wiring network with a much more complex control is required.

To simplify the wiring of the disk drive 10 and further reduce the mass of material that is displaced upon displacement of the suspension 32 relative to the actuator arm 18, a single signal MA+ or MA− is provided by the disk drive electronic control (not shown) which may be conducted to each of the micro-actuators 40 in the actuator assembly 12 to cause displacement of the suspensions 32 and magnetic read/write heads 50 in accord therewith.

The orientation of the micro-actuators 40 relative to each other may determine the direction of movement of the suspension arms 32 in response to the single control signal, MA+ or MA−, assuming that the micro-actuator 40 is installed identically within all suspensions 32.

With a single micro-actuator signal applied to identical polarity micro-actuators 40 on suspension arms 32 and with identical polarity connections on the micro-actuators 40, the micro-actuator 40 on the top of a selected actuator arm 18 will move in a first direction and the micro-actuator 40 on the bottom of a selected actuator arm 18 will move in a second and opposite direction. This movement by each of the suspension arms 32 and magnetic read/write heads 50 will effectively cancel inertia created by movement of the other suspension arms 32 and heads 50, relative to the selected actuator arm 18. While each of the topmost and bottommost actuator arms 32 are subject to the inertia of the single suspension 32 attached thereto, inertia of each of the topmost and bottommost suspension arms 32 is canceled by the combined inertia of the movement of the topmost and bottommost suspension arms 32 and magnetic read/write heads 34 counter-movement.

This cancellation of inertia of movement of the suspension 32 and magnetic read/write head 50 creates a very stable actuator arm assembly 12 from which all suspension arms 32 are suspended.

Again referring to FIGS. 2 and 3, by designing the conductor land patterns of the flexible circuit 52 to meet the connection needs, the polarity of the connections to a micro-actuator 40 may be reversed, thus reversing its response to the signal. This may permit both suspension arms 32 on a single actuator arm 18 to move in the same direction with one-half of suspension arms 32 to be so selected for wiring so that a first one-half of the suspension arms 32 and magnetic read/write heads 50 will move in a first direction and, simultaneously, the second half of the suspension arms 32 and magnetic read/write heads 50 move in the opposite direction.

As can be appreciated by one of skill in the art and with the benefit of the foregoing explanation, various patterns of counteracting movements may be effected by a single control signal depending upon the physical orientation or polarity of the micro-actuators 40 and/or the polarity of the connections thereto.

Figure 4:
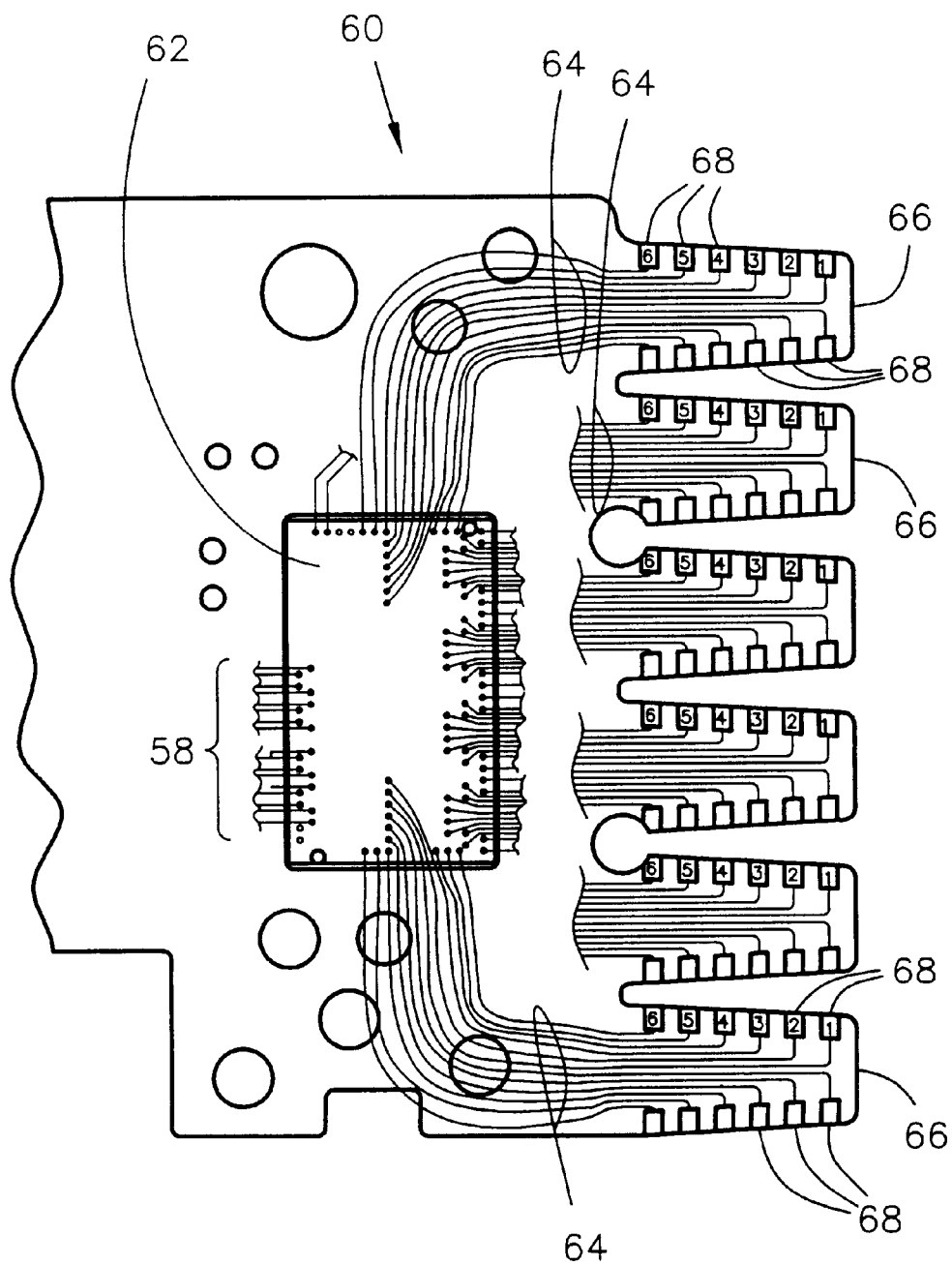
FIG. 4 is an illustration of a portion of the flexible circuit which conducts the signals for controlling the micro-actuator and magnetic read/write head to and from the actuator arm electronics and connects with the flexible circuit illustrated in FIGS. 2 and 3.

FIG. 4 illustrates electronic circuit 60 which is connected to the control signal lines 58 from the disk drive electronic card (not shown) which interprets the data storage or retrieval commands from the host computer (not shown) in a conventional manner. An electronic multiplexor and pre-amplifier chip 62 receives commands over a group of signal lines 58 and selects the head 50 to be addressed, provides either a read data signal R– or R+ or write data signal W– or W+ to only the selected magnetic read/write read/write head 50 and a micro-actuator control signal MA– or MA+ is supplied by the disk drive electronics (not shown) to all of the micro-actuators 40 in the disk drive 10.

The output signals are conducted over conductive patterns or groups of signal lines 64. Each of the conductive patterns 64 terminates each of its conductors at a contact solder pad 68 on the flexible cable connector tab 66.

Figure 5:
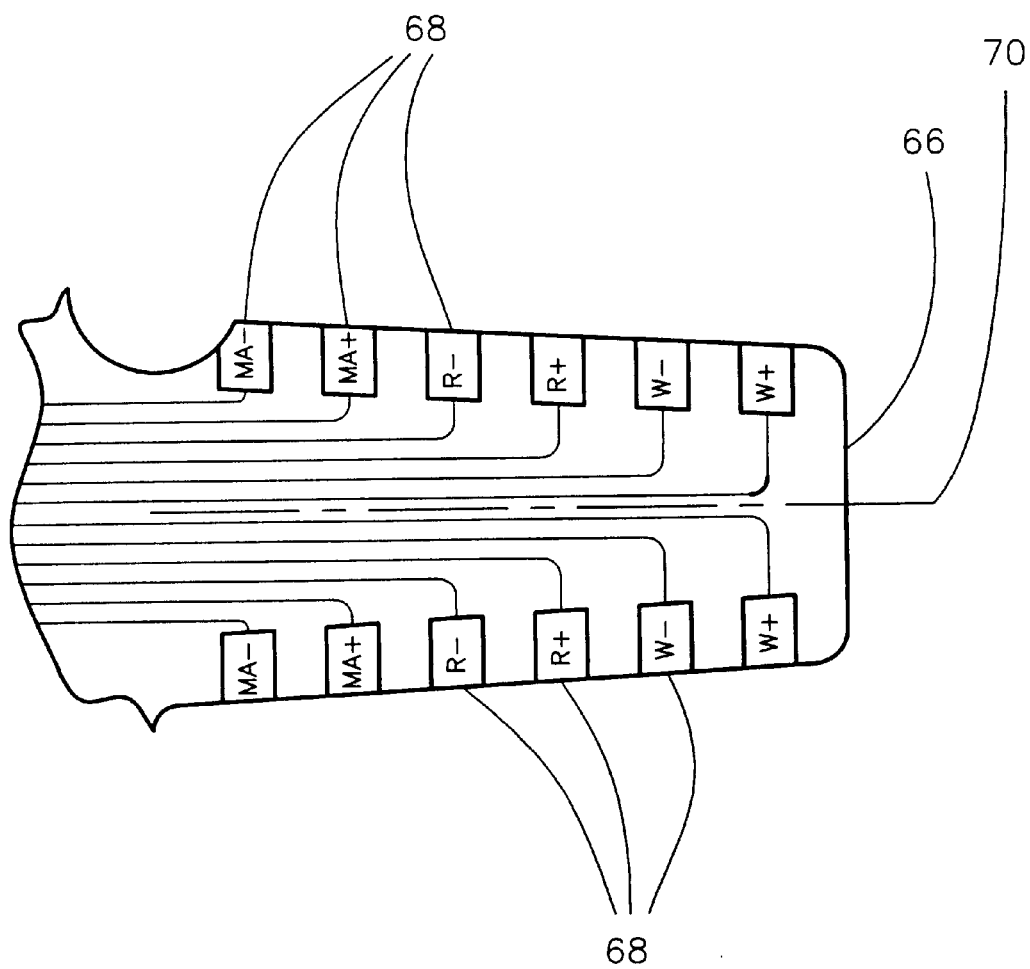
FIG. 5 is an enlarged illustration of the configuration of the connection tabs which connect to flexible circuit illustrated in FIGS. 2 and 3 that serve the micro-actuators and magnetic read/write heads on a single actuator arm disposed between two adjacent magnetic recording disks.

FIG. 5 is an enlargement of the flexible cable connector tab 66 shown in FIG. 4 with signal identities marked on the respective solder connection pads 68. The center line 70 of the tab 66 is indicated and the tab 66 may be folded along its centerline 70 and thereby present solder connection pads 68 to the solder connection pads 74 as illustrated in FIG. 2 as part of flexible circuit 52. The connection tab 66 can contact connection pads 74 on both an upwardly facing tab 72 as well as a mirror image, downwardly facing tab 72 (not visible) supported on actuator arm 18, thereby serving both flexible circuit cables 52 on a single actuator arm 18. The tabs 66 then are soldered to the tabs 72 on the flexible circuits 52 to complete the connection.

Figure 6:
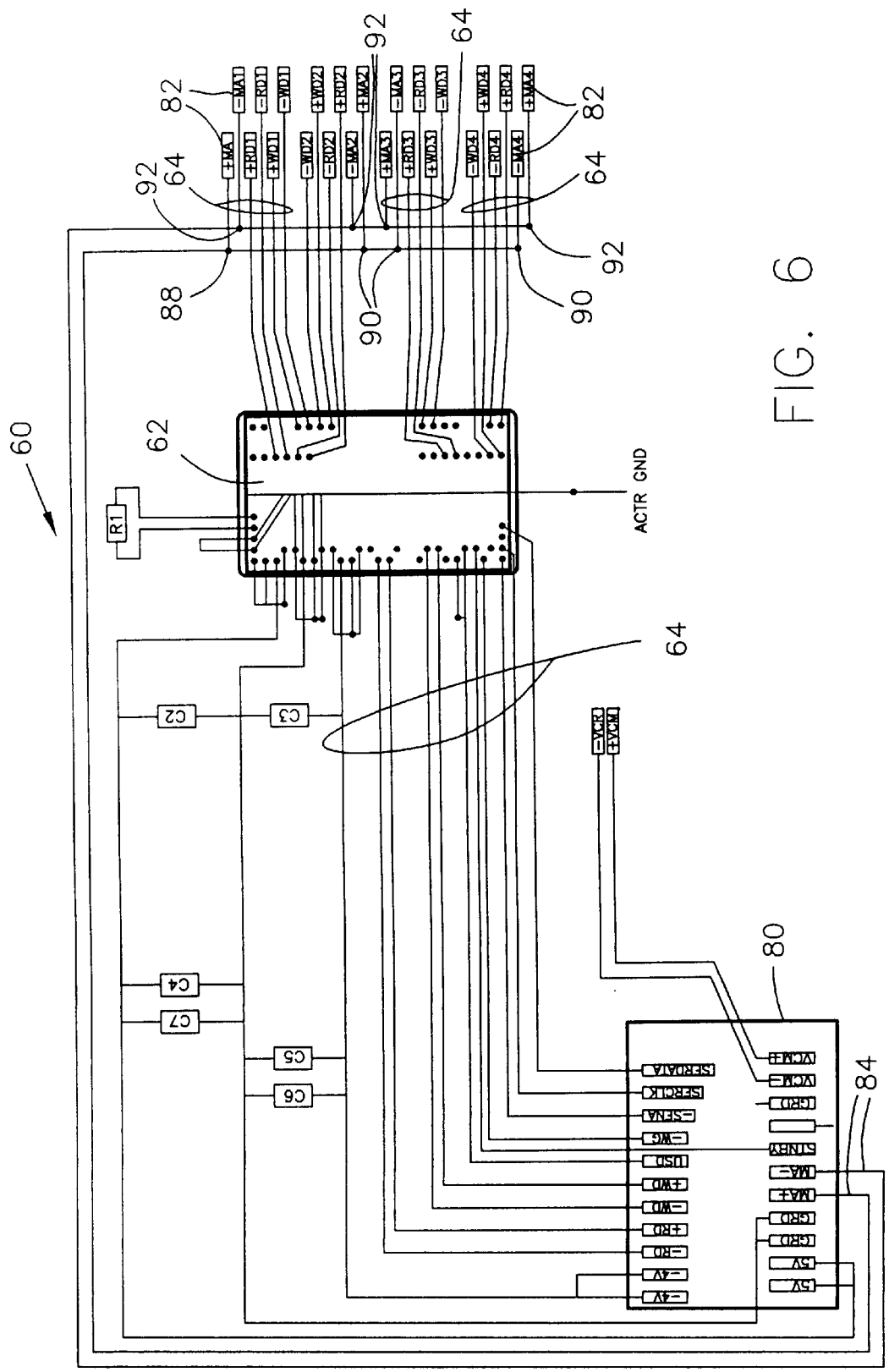
FIG. 6 is a circuit diagram of the connections of the flexible circuit shown in FIG. 4 to the actuator arm electronics.

Referring now to FIG. 6, a circuit diagram of the flexible circuit 60 and illustrated in a two disk, four suspension and four head configuration for simplicity. Circuit 60 has the electronic multiplexor/pre-amplifier chip 62 interconnecting the input pins of connector 80 to and with the signal lines 64 grouped to serve the respective magnetic read/write head 50 and micro-actuators 40 (not shown in FIG. 6 but illustrated in FIGS. 2 and 3). The labeled rectangles 82 are representative of a plurality of solder connection pads 68 on the tabs 66 as seen in FIG. 4. However, if a sufficiently small connector is used, rectangle 82 may represent pins mateable with a complementary connector.

Referring to the contacts MA– and MA+ of the connector 80, conductors 84 are routed directly to the MA– and MA+ solder pads 82.

Note that the MA+ signal line 84 is connected at 88 to MA+1 solder pad 82 while the MA+ signal line 84 is similarly connected at 90 to the MA+2, MA–3 and MA–4 solder pads 82. Analogously, the MA– signal line 84 is connected at connection point 92 to the MA–1, MA–2, MA+3 and MA+4 solder connection pads 82 and the solder pads 74 of the flexible circuit tab 72 of FIG. 2. In FIG. 2, assuming the magnetic read/write head suspension arms 32 are all of identical construction including orientation and polarity of the micro-actuator 40 therein, the suspension arms 32 and the magnetic read/write heads 50 will react to a MA+ control signal as follows: suspension arms 32-1 and 32-4 will move in a first (arbitrarily left) direction and suspension arms 32-2 and 32-3 will move in a first (arbitrarily right) direction.

Whenever a reference numeral is followed by –X and where X is a single digit number, X indicates the suspension arm 32 sequence number, numbered from one end of the disk stack 30 (FIG. 1).

By a study of the connection pattern 88, 90, 92 in FIG. 6, it can be seen that the connection of a first polarity micro-actuator control signal may be made in a variety of patterns and such connection pattern determines the direction of movement of the suspension arm 32 and magnetic read/write head 50 in response to a selected micro-actuator signal MA+ or MA–. By designating a pattern of connections, the movement of the suspension arms 32 may be directed in designated directions and a balance of the inertia forces created by one-half of the suspension arms 32 is accomplished by the inertia forces created by the other half of the suspension arms 32 in response to either a MA+ or MA– signal impressed on all of the micro-actuators 40.

While the invention has been described with respect to a micro-actuator 40 incorporated into a portion of the suspension arm 32, the invention would be similarly applicable to a milli-actuator which typically would be located at, on or near the distal end of the suspension arm 32 and utilize the same general type of electrically deformable materials to shift the magnetic read/write head 50 laterally relative to the longitudinal axis of the suspension arms 32. For example, the milli-actuator would shift the magnetic head 50 by very small increments without the benefit of a mechanical advantage applied to the displacement of the magnetic head 50, suspending the magnetic read/write head 50 from a device which changes shape or bends under the influence of an electrical control signal. As discussed above with respect to the micro-actuator 40, an analogous approach to the electrical signal connections to the electronically controlled positioning element can be used to create an even more dense recording track pattern.

Should the need arise for such density, a milli-actuator could be installed on a suspension arm 32 having a micro-actuator 40, as described above, resulting in an exponential increase in read/write transducer or head positioning resolution and recording capacity over the use of only a fixed actuator arm or the use of an actuator arm having a micro-actuator incorporated therein.

This description of the invention is intended to provide one of skill in the art the knowledge necessary to practice the invention and is not intended to limit the scope of the invention in any way.

It is contemplated that those persons of skill in the art will recognize that other minor modifications may be incorporated into the control and structure of the disk drive while at the same time not to remove the resulting structure and control from the scope of the attached claims. Only the attached claims are intended to define the scope of the invention.

We claim:

1. An actuator arm inertia control for a disk drive micro-actuator controlled reading/recording transceiver stack with minimized micro-actuator control input/output, comprising:

a plurality of data storage disks rotatably disposed in a stack surrounding an axis of rotation, each said data storage disk axis of rotation coincident with all other storage disk axes of rotation;

at least a pair of actuator arms, each supporting a magnetic read/write transducer on a distal portion thereof, disposed one on each side of each of said data storage disks;

each of said actuator arms further comprising at least one suspension arm comprising said magnetic read/write transducer, and a micro-actuator controllable to dispose said magnetic read/write transducer in one of a plurality of locations on both sides of a null position of said magnetic read/write transducer;

an actuator connected to all of said actuator arms for displacing said arms and said transducers relative to said disks for establishing a null position of each of said transducers relative to said actuator arms;

substantially equal numbers of said micro-actuators electrically connected to effect movement in opposite directions relative to said data storage disks in response to a single electronic control signal conveyed to all micro-actuators, effecting movement of said magnetic read/write transducers to one of said plurality of locations, and whereby, said movement of one-half of said magnetic read/write transducer in a first direction cancels and neutralizes inertia effects of said other substantially equal number of said magnetic read/write transducer in an opposite, second direction in response to said single electronic signal.

2. The inertia control for a disk drive micro-actuator controlled transducer stack of claim 1 wherein selected ones of said micro-actuators are electrically connected in parallel and remaining micro-actuators connected in parallel and in an opposite polarity to said selected ones of said micro-actuators.

3. The inertia control for a disk drive micro-actuator controlled transducer stack of claim 2 wherein said selected ones alternate with said remaining micro-actuators.

4. The inertia control for a disk drive micro-actuator controlled transducer stack of claim 1 wherein said selected ones of said magnetic (read/write heads) are disposed in at least one group and said remaining micro-actuators are disposed in at least one group.

5. The inertia control for a disk drive micro-actuator controlled transducer stack of claim 2 wherein said selected ones are disposed on alternating actuator arms disposed between adjacent recording disk surfaces of adjacent recording disks.

6. The inertia control for a disk drive micro-actuator controlled transducer stack of claim 5 wherein said selected ones of said micro-actuators are disposed singly on actuator arms at the extremes of said head stack and connected to move in an identical direction relative to said disks.

7. The inertia control for a disk drive micro-actuator controlled transducer stack of claim 5 wherein said selected ones of said micro-actuators are disposed singly on actuator arms at the extremes of said head stack and connected to move in opposite directions relative to said disks.

8. An inertia control for a disk drive micro-actuator controlled reading/recording transducer stack with minimized micro actuator control input/output comprising:

a plurality of data storage disks rotatably disposed in a stack surrounding an axis of rotation, each said data storage disk axis of rotation coincident with all other storage disk axes of rotation;

at least a pair of actuator arms, each supporting a magnetic read/write transducer on a distal portion thereof, disposed one on each side of each of said data storage disks;

each of said actuator arms further comprising at least one suspension arm comprising said magnetic read/write transducer and a micro-actuator controllable to dispose said magnetic read/write transducer in one of a plurality of locations on both sides of a null position of said magnetic read/write transducer;

an actuator connected to all of said actuator arms for displacing said arms and said transducers relative to said disks for establishing a null position of each of said transducers relative to said actuator arms;

substantially equal numbers of said micro-actuators disposed in reversed orientation relative to said suspension arm and electrically connected to effect movement in opposite directions relative to said data storage disks in response to a single electronic signal conveyed to all micro-actuators, to effect movement of said magnetic read/write transducers to one of said plurality of locations, and whereby, said movement of one-half of said magnetic read/write transducer in a first direction cancels and neutralizes inertia effects of said other substantially equal number of said magnetic read/write transducer in an opposite, second direction in response to said single electronic signal.

9. The inertia control for a disk drive micro-actuator controlled transducer stack of claim 8 wherein all said micro-actuators are electrically connected in parallel.

10. The inertia control for a disk drive micro-actuator controlled transducer stack of claim 9 wherein said reversed orientation micro-actuators alternate with said remaining micro-actuator.

11. The inertia control for a disk drive micro-actuator controlled transducer stack of claim 10 wherein said reversed orientation micro-actuators are disposed in at least a first grouping and said remaining micro-actuators are disposed in at least a second grouping.

12. The inertia control for a disk drive micro-actuator controlled transducer stack of claim 10 wherein said micro-actuators of said reversed orientation are disposed on alternating actuator arms disposed between adjacent recording disk surfaces of adjacent recording disks.

13. The inertia control for a disk drive micro-actuator controlled transducer stack of claim 12 wherein said reversed orientation micro-actuators are disposed singly on suspension arms disposed at extremes of said head stack and disposed on said suspension to move in an identical direction relative to said disks.

14. The inertia control for a disk drive micro-actuator controlled transducer stack of claim 12 wherein said reversed orientation micro-actuators are disposed singly on actuator arms at the extremes of said head stack and connected to move in opposite directions relative to said disks.

* * * * *